United States Patent Office 3,426,050
Patented Feb. 4, 1969

3,426,050
TETRA(PHENYLPHOSPHINATES) OF TITANIUM AND ZIRCONIUM
Gerd Helmut Dahl, King of Prussia, Pa., assignor to Pennsalt Chemicals Corporation, Philadelphia, Pa., a corporation of Pennsylvania
No Drawing. Filed Jan. 21, 1966, Ser. No. 522,043
U.S. Cl. 260—429.3                5 Claims
Int. Cl. C07f 7/28; C10m 1/46

ABSTRACT OF THE DISCLOSURE

Titanium and zirconium tetrakis(phenylphosphinates) useful as viscosity improvers for oils and as grease thickeners are provided having the formulae $M[OP(Ph)_2O]_4$ and $M[OP(R)(Ph)O]_4$ where M is titanium or zirconium, Ph is phenyl or substituted phenyl and R is alkyl.

---

This invention relates to new tetraphosphinates of titanium and zirconium. More particularly, this invention concerns titanium and zirconium tetrakis (diphenylphosphinates) and tetrakis (alkylphenylphosphinates) having the formulae $M[OP(Ph)_2O]_4$ and $$M[OP(R)(Ph)O]_4$$

where M is titanium or zirconium, R represents an alkyl group having from one to eight carbon atoms, i.e., methyl, ethyl, isopropyl, butyl, etc., and Ph represents a phenyl radical or mono- or multi-substituted phenyl radical wherein the substituents on said phenyl group are independently selected from the group consisting of the halogens and alkyl groups having one to eight carbon atoms. Representative substituted phenyl radicals are, for example, ortho-chlorophenyl, ortho-methylphenyl, pentafluorophenyl, 2,4-dichlorophenyl, 2,4-dimethylphenyl, ethylphenyl, 2-chloro, 4-methylphenyl and the like.

The tetraphosphinates of this invention are conveniently prepared by reacting the appropriate phosphinic acid, e.g., diphenylphosphinic acid, $(C_6H_5)_2P(O)OH$, or an alkylphenylphosphinic acid, i.e., $RPhP(O)OH$, Ph and R being defined above, with an alkoxide or acetylacetonate of titanium or zirconium, for example, compounds such as $M(CH_3COCHCOCH_3)_4$, $M(OR')_4$, and $M(OR')_2(CH_3COCHCOCH_3)_2$ where M is titanium or zirconium, and R' is an alkyl group having from one to four carbon atoms. The foregoing reactions are advantageously carried out in an inert organic diluent for the tetraphosphinate such as benzene, toluene, xylene, chloroform, carbon tetrachloride, tetrachloroethane, and others, at a temperature within the range of about 70° C. to about 145° C. The product is recovered from the reaction mixture by filtration or centrifugation, or by separation from the diluent by distillation of the volatile solvent and by-products, using well known processing techniques.

The titanium and zirconium tetraphosphinates of this invention are useful as additives for hydraulic fluids, oils and the like where, in an amount of about 1 to about 10% of the lubricating fluid, they serve to stabilize its viscosity during temperature fluctuations. The tetraphosphinates also are useful to thicken synthetic lubricant greases derived from diesters of carboxylic acids (such as sebacic, azelaic and adipic acid) and a primary or oxo alcohol containing about 8 to 10 carbon atoms. The tetraphosphinate additive is about 15% to about 25% by weight of the diester fluid in the grease compositions.

The following examples illustrate typical preparations of the compounds of this invention.

Example 1

2.5 grams of $Ti(OC_2H_5)_4$ was added to a suspension of 9.5 grams of diphenylphosphinic acid $$((C_6H_5)_2P(O)OH)$$

in 200 ml. of toluene. The reaction mixture was refluxed (110° C.) for about 20 hours. The toluene diluent and by-product ethanol were then removed from the mixture by distillation. The residue was treated with petroleum ether and the ether was evaporated from the extract to yield the pale yellow, solid product $Ti[OP(C_6H_5)_2O]_4$ which softened at about 135° C. and became liquid at 180° C.

*Analysis.*—Found: C, 62.52; H, 4.79; P, 13.02; Ti, 5.3. Calculated for $C_{48}H_{40}O_8P_4Ti$: C, 62.89; H, 4.40; P, 13.52; Ti, 5.2.

This titanium tetraphosphinate is insoluble in water, slightly soluble in hexane, and soluble in ethanol, diethyl ether, acetone and benzene.

Example 2

To 3.12 grams of $Zr(CH_3COCHCOCH_3)_4$ in 50 ml. of benzene diluent was added 5.89 grams of $$(C_6H_5)_2P(O)OH$$

The reaction mixture was refluxed (80° C.) for about 2 hours. The white precipitate which formed was recovered by filtration, washed with benzene and petroleum ether, and dried. The product, recovered in 88.6% yield, was identified as $Zr[OP(C_6H_5)_2O]_4$, M.P. 472–474° C.

*Analysis.*—Found: C, 60.68; H, 4.51; Zr, 9.8. Calculated for $C_{48}H_{40}O_8P_4Zr$: C, 60.06; H, 4.21; Zr. 9.53.

This zirconium tetraphosphinate is soluble in benzene or ethanol but is insoluble in diethyl ether or acetone.

Example 3

To a solution of 2.32 grams of $Ti(OC_2H_5)_4$ in 200 ml. of benzene was added 6.37 grams of methylphenylphosphinic acid $(CH_3)(C_6H_5)P(O)OH$. The reaction mixture was stirred at reflux for 20 hours. The solvent was stripped and the residue was washed with petroleum ether. The solid product, identified as $Ti[OP(CH_3)(C_6H_5)O]_4$, softened at about 106° C. and became liquid at about 130° C.

Example 4

To a solution of zirconium isopropoxide, $$Zr[OCH(CH_3)_2]_4$$

in benzene was added di(ortho-methylphenyl)phosphinic acid, $(o\text{—}CH_3C_6H_4)_2P(O)OH$. The vigorously stirred mixture was refluxed for several hours and then the solvent was removed by distillation. The remaining colorless solid was identified as $Zr[OP(o\text{—}CH_3C_6H_4)_2O]_4$.

Example 5

A solution of $Ti(OC_2H_5)_2(CH_3COCHCOCH_3)_2$ in toluene was treated with $(C_6F_5)_2P(O)OH$. The vigorously stirred reaction mixture was refluxed for several hours and the solvent removed. The remaining, nearly colorless solid was identified as $Ti[OP(C_6F_5)_2O]_4$.

Example 6

To a solution of $Ti[OCH(CH_3)_2]_4$ in toluene was added di(ortho-propylphenyl)phosphinic acid, $$(o\text{—}C_3H_7C_6H_4)_2P(O)OH$$

The reaction mixture was stirred and refluxed. Upon removal of solvent a nearly colorless solid was recovered which was identified as $Ti[OP(o\text{—}C_3H_7C_6H_4)_2O]_4$.

It is understood that the foregoing examples are illustrative and not limitative of the scope of this invention as defined by the following claims.

I claim:
1. A tetraphosphinate having the formula selected from the class consisting of

(I)  M[OP(Ph)$_2$O]$_4$ (II) 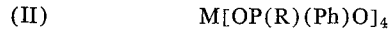 M[OP(R)(Ph)O]$_4$ where M is titanium or zirconium, R represents an alkyl group having from one to eight carbon atoms, and Ph represents a phenyl radical or substituted phenyl radical wherein the substituents on said phenyl group are independently selected from the group consisting of the halogens and alkyl groups having one to eight carbon atoms.

2. A tetraphosphinate of Formula I of claim 1 wherein M is titanium and Ph represents C$_6$H$_5$.

3. A tetraphosphinate of Formula I of claim 1 wherein M is zirconium and Ph represents C$_6$H$_5$.

4. A tetraphosphinate of Formula II of claim 1 wherein R is methyl and Ph represents C$_6$H$_5$.

5. A tetraphosphinate of Formula I of claim 1 wherein Ph represents methylphenyl.

References Cited

UNITED STATES PATENTS

| | | | |
|---|---|---|---|
| 2,228,659 | 1/1941 | Farrington et al. | 260—429.5 |
| 2,311,306 | 2/1943 | Ritchey | 260—429.5 |
| 2,346,155 | 4/1944 | Denison et al. | 260—429.3 |

OTHER REFERENCES

Izvestia Akak. Nauk SSSR, p. 651 (April 1964), (copy in Group 112 260/429.5).

HELEN M. McCARTHEY, *Primary Examiner.*

H. M. S. SNEED, *Assistant Examiner.*

U.S. Cl. X.R.

252—49.7; 260—429.5